H. Bigelow,
Gain Chisel.

No. 106,310.        Patented Aug. 16, 1870.

WITNESSES
P. C. Dietrich
L. S. Hoabee

INVENTOR
H. Bigelow
per
ATTORNEYS

United States Patent Office.

HIRAM BIGELOW, OF SKOWHEGAN, MAINE.

Letters Patent No. 106,310, dated August 16, 1870.

IMPROVEMENT IN CHISEL FOR CUTTING GAINS.

The Schedule referred to in these Letters Patent and making part of the same.

*To all whom it may concern:*

Be it known that I, HIRAM BIGELOW, of Skowhegan, in the county of Somerset and State of Maine, have invented a new and useful Improvement in a Gain Chisel; and I do hereby declare that the following is a full, clear, and exact description thereof, which will enable others skilled in the art to make and use the same, reference being had to the accompanying drawing, forming part of this specification.

The object of this invention is to provide a tool for facilitating the operation of letting butt hinges into window-blinds, shutters, doors, trunks, and for all purposes for which butt hinges are used when they are let into the wood; and The invention consists in combining adjustable gauges, and an adjustable spur, with one or more chisels, by means of which gains may be cut in the wood for receiving the butt, as will be hereinafter more fully described.

In the accompanying drawing—

Similar letters of reference indicate corresponding parts.

Figure 1:
Figure 1 represents a face view of the tool, showing the adjustable gauge on the face of the chisel.

In this example of my invention, I show two chisels fixed stationary to a handle or stock with a gauge turning on pivots, and operating in connection with one of the chisels to govern the cut thereof in depth and thickness. But I do not confine myself to the use of the second chisel, and when I do use it I may decide to make it adjustable, so that the tool may be used for butts of different widths. Instead of pivoting the gauge to the stock, I may decide to connect it with the chisel in some other way, but so that it will produce the same or a similar result.

A represents the handle having a square stock, B, to which the chisels are fastened on opposite sides, as seen in the drawing.

C is the chisel, which operates more directly in connection with the gauge.

D is the opposite or second chisel.

E is the hinged or pivoted gauge, which consists of two arms, *f* and *g*, connected together by the gauge H, which is made adjustable on the arms *f g* by means of screws and slots, as seen at I I, fig. 1.

J is an adjustable plate with a spur, *k*, in its end.

When the gauge E is turned back at right angles with the stock B it governs the reach of the spur on to the stile of the blind.

When the gauge E is turned down parallel with the face of the chisel, as seen in fig. 1, the adjustable gauge H governs the cut of the chisel as regards the reach of the gain on to the stile.

Figure 2:
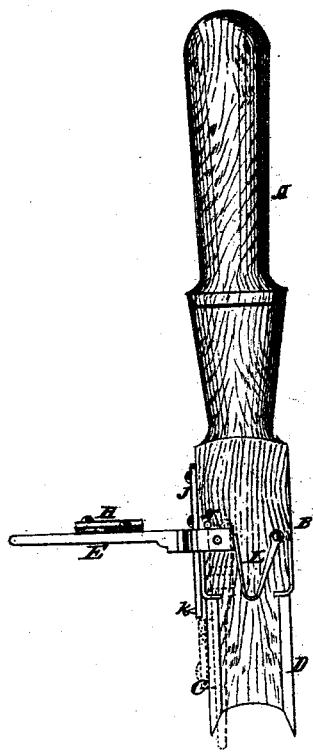
Figure 2 is an edge view of the same, showing the gauge at right angles with the face of the chisel.

As seen in dotted lines in fig. 2, the arms E drop back past the edge of the chisel, the space between them representing the thickness of butt or depth of the gain. As the tool is forced down this thickness is cut out, and the gain is complete and ready for the butt.

In using the tool, the first operation is to place the arms (or gauge E) at right angles with the stock, and mark with the spur the reach of the gain on to the stile. The chisel edges are then placed so that their corners intersect the line thus made. A slight blow with a mallet on the end of the handle will drive the chisels to the proper depth. The gauge E is then turned down, as seen in dotted lines, and the chisel C is placed in position between the two cross-cuts thus made, and forced down, the gauge E governing the thickness of cut, and the gauge H the reach, which which will be the mark made by the spur *k*.

L is a spring on each side of the stock, which acts against the ends of the arms *f g* to hold them in place.

N represents a stop-pin on each side, so placed as to keep the arms at right angles with the stock when the spur is used.

It will be seen that the gauges are used on a single chisel, and that the second chisel may be dispensed with, or made adjustable, as before mentioned.

Having thus described my invention,

I claim as new and desire to secure by Letters Patent—

1. The gauge E, (or arms *f g*,) gauge H, and spur *k*, or their equivalents, in combination with a chisel, when arranged to operate substantially as and for the purposes described.

2. The combination with the stock and handle A B, of the chisels C and D, gauges E and H, and spur-plate J, substantially as and for the purposes herein shown and described.

HIRAM BIGELOW.

Witnesses:
 STEPHEN COLMAN,
 C. D. MILLER.